United States Patent [19]

Okimoto et al.

[11] Patent Number: 5,127,748
[45] Date of Patent: Jul. 7, 1992

[54] DOCUMENTATION SYSTEM HAVING MULTILINGUAL FUNCTION

[75] Inventors: Satoshi Okimoto, Komaki; Yukiharu Fujikawa; Miyako Mukai, both of Nagoya, all of Japan

[73] Assignee: Brother Kogyo Kabushiki Kaisha, Nagoya, Japan

[21] Appl. No.: 616,695

[22] Filed: Nov. 21, 1990

Related U.S. Application Data

[63] Continuation of Ser. No. 322,672, Mar. 13, 1989, abandoned.

[30] Foreign Application Priority Data

Mar. 16, 1988 [JP] Japan .................................. 63-62254

[51] Int. Cl.⁵ ................................................ B41J 5/30
[52] U.S. Cl. ........................................ 400/70; 400/109; 304/419
[58] Field of Search ................ 400/70, 109, 110, 484; 364/419

[56] References Cited

U.S. PATENT DOCUMENTS

| | | | |
|---|---|---|---|
| 3,996,584 | 12/1976 | Plager | 400/109 |
| 4,124,843 | 11/1978 | Bramson et al. | 400/109 |
| 4,468,754 | 8/1984 | Asada | 400/109 |
| 4,469,455 | 9/1984 | Makita | 400/109 |
| 4,511,891 | 4/1985 | Nakatani | 400/110 |

FOREIGN PATENT DOCUMENTS

| | | | |
|---|---|---|---|
| 0031446 | 7/1981 | European Pat. Off. | 400/109 |
| 0064592 | 11/1982 | European Pat. Off. | 400/109 |
| 2167013 | 5/1986 | United Kingdom | 400/110 |
| 2194660 | 3/1988 | United Kingdom | 400/109 |

*Primary Examiner*—David A. Wiecking
*Assistant Examiner*—Steven S. Kelley
*Attorney, Agent, or Firm*—Oliff & Berridge

[57] ABSTRACT

A documentation system having a multilingual function, including a keyboard; a keyboard mode selecting device for setting at least a standard language mode and a multilingual mode wherein one keyboard mode (an optional language mode different from the standard keyboard language mode) can be selected from a plurality of selectable optional language keyboard modes; an optional language keyboard mode selecting device for selecting one optional language mode from said plurality of selectable optional language keyboard modes according to an operation of certain predetermined keys on the keyboard while in the multilingual mode; a selected keyboard mode storing device for storing an optional language mode selected by the optional language keyboard mode selecting device; and a selected keyboard mode reading device for automatically reading the optional language mode selected from the selected keyboard mode storing device when the multilingual mode is set by the keyboard mode selecting device so as to automatically condition the keyboard into the selected optional language keyboard mode whenever the multilingual mode is set. With this arrangement, one of the selectable (optional language) keyboard modes is selected by the optional language keyboard mode selecting device, and it is stored in the selected keyboard mode storing device. Subsequently, when the multilingual mode is set (selected) by an operator, the keyboard is automatically conditioned into the proper optional language mode by a read from the selected keyboard mode storing device. Thus, the keyboard is conditioned into the previous selected optional language keyboard mode by simply selecting the multilingual mode, thereby simplifying and improving keyboard mode selection operations.

12 Claims, 5 Drawing Sheets

DOCUMENTATION SYSTEM HAVING MULTILINGUAL FUNCTION

This is a continuation of application Ser. No. 07/322,672 filed Mar. 13, 1989 now abandoned.

BACKGROUND OF THE INVENTION

The present invention relates to a documentation as an electronic typewriter and a word processor having a keyboard for inputting data, and more particularly to a documentation system having a multilingual function.

If multilingual characters such as English, German and French in addition to many kinds of symbols such as Greek letters and special scientific symbols were intended to be used in creating a document with a documentation system having no multilingual function, the number of keys of the keyboard would be so increased to reduce a practical usability. Accordingly, the above-mentioned documentation system having a multilingual function has been proposed.

Such a documentation system having a multilingual function is disclosed in U.S. Pat. No. 4,124,843, for example. In this prior art, a desired language mode can be arbitrarily selected by an operator from a plurality of predetermined language modes. The key arrangement of the keyboard includes a plurality of fixed key trains commonly employable for a plurality of languages and a single train of variable keys changeable among the plural languages. The variable keys permit the operator to input data in one selected from the plural language modes. When an operator intends to change a language (e.g., English) currently used into another language (e.g., German), a predetermined key for setting a language mode changeable condition is depressed, and then a specific key for inputting a code for specifying a language mode to be changed. Such operation must be repeated every time the language is intended to be changed. Accordingly, key operation of the keyboard is troublesome.

More specifically, as described in column 6 of this reference cited, if an English mode is changed into a French mode, for example, (1) "GO TO HEAD" key as best seen in FIG. 3 of this reference cited is first depressed; (2) the cursor on the display is moved to a "language selection" position; (3) the alphabetical character keys of the keyboard are depressed to input "FR" or "FRENCH"; and (4) "GO TO TEXT" key is depressed to enter information of this language. This information is stored as a language index in a memory table. In the keyboard having the French mode, when one of the variable keys is depressed, a display table in a memory corresponding to this variable key depressed is retrieved, while the language index is read, and a character pattern data corresponding to the language index is also read, thus displaying a desired French character on a display device. Thereafter, when the French mode is returned to the English mode, the above four-stage key operation is also required, provided that the third stage (3) is carried out such that "EN" or "ENGLISH" is input. Further, when the English mode is changed again into the French mode, the above four-stage key operation is required.

In this manner, this prior art requires the four-stage key operation every time a primary language mode (e.g., English mode) is changed into a secondary language mode (e.g., French mode) and vice versa. Accordingly, when the change or selection of the language mode is frequently conducted, much time and labor for effecting the key operation is required to cause troublesome data inputting.

Furthermore, in creating or editing a scientific report or the like, there occurs a necessity of inputting various special symbols in addition to normal characters. In the prior art, the inputting of some special symbols can be effected by utilizing a shift key in combination with numeral keys. However, the number of special symbols capable of being inputted is limited.

SUMMARY OF THE INVENTION

Accordingly, it is a first object of the present invention to provide a documentation system having a multilingual function which eliminates a troublesome key operation in changing a domestic language from a foreign language and vice versa.

It is a second object of the present invention to provide a documentation system having a multilingual function which enables an operator to select one of plural foreign languages different from the domestic language.

It is a third object of the present invention to provide a documentation system having a multilingual function which enables the operator to input various special symbols.

In respect of the first object, the operator can set either of a standard mode corresponding to a domestic language, for example, or a multilingual mode corresponding to various foreign languages by a simple key operation. In respect to the second object, the operator can select one of the plural foreign languages and preliminarily store the selected foreign language in the multilingual mode. Further, in respect of the third object, the present invention includes a second standard mode to be used by most users corresponding to various special symbols, for example, in addition to a first standard mode corresponding to a domestic language and the multilingual mode, and one of these modes can be set by a simple key operation.

According to the present invention, there is provided a documentation system having a multilingual function, comprising:

a keyboard for inputting data in a keyboard mode comprising a standard language mode for inputting a standard language and a multilingual mode for inputting one optional language arbitrarily selected from a plurality of optional languages different from said standard language;

a keyboard mode selecting means for selecting any one of at least said standard language mode and said multilingual mode;

a means for selecting any one of a plurality of predetermined optional language modes to be employed when using the multilingual mode;

a selected keyboard mode storing means for storing an optional language mode selected as the keyboard mode;

a selected keyboard mode reading means for reading the optional language mode stored in the selected keyboard mode storing means when said multilingual mode is selected by a user with the keyboard mode selecting means; and a data processing means for converting a key code data into a character data and outputting that character data on the basis of a standard language mode when the standard language mode is selected by said keyboard mode selecting means, while converting and outputting on the basis of the optional language mode that was stored in the selected keyboard mode storing means (and is subsequently read by said selected keyboard mode reading means) whenever the multilingual mode is selected by an operator using the keyboard mode selecting means, wherein once any one of the optional language modes to be employed in the multilingual mode is selected, then whenever the multilingual mode is selected, the updated optional language mode will now be read so as to enable the data to be automatically inputted in the selected optional language mode without the necessity of again manually selecting that particular optional language mode. The concept of the present invention is schematically illustrated in FIG. 1.

With this constitution, one of the selectable keyboard modes is selected by the keyboard mode selecting means, and it is stored in the selected keyboard mode storing means. Subsequently, when the multilingual mode is set by an operator, the keyboard is automatically conditioned into a keyboard mode read from the selected keyboard mode storing means. Thus, the keyboard is conditioned in the selected keyboard mode only by setting the keyboard into the multilingual mode, thereby improving the key operation.

The invention will be more fully understood from the following detailed description and appended claims when taken with the drawings.

DETAILED DESCRIPTION OF THE PREFERRED EMBODIMENT

There will now be described a preferred embodiment of the present invention with reference to FIGS. 2 to 6, wherein the present invention is applied to an electronic typewriter.

Figure 1:
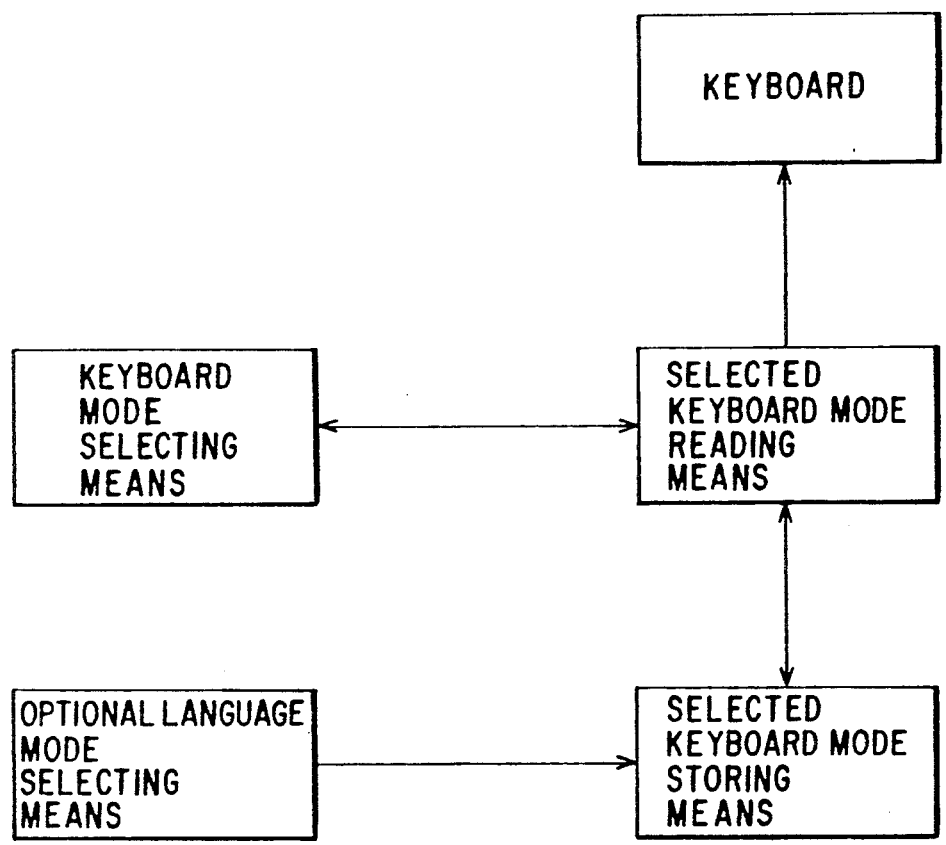
FIG. 1 is a block diagram illustrating the concept of the present invention.
Figure 2:
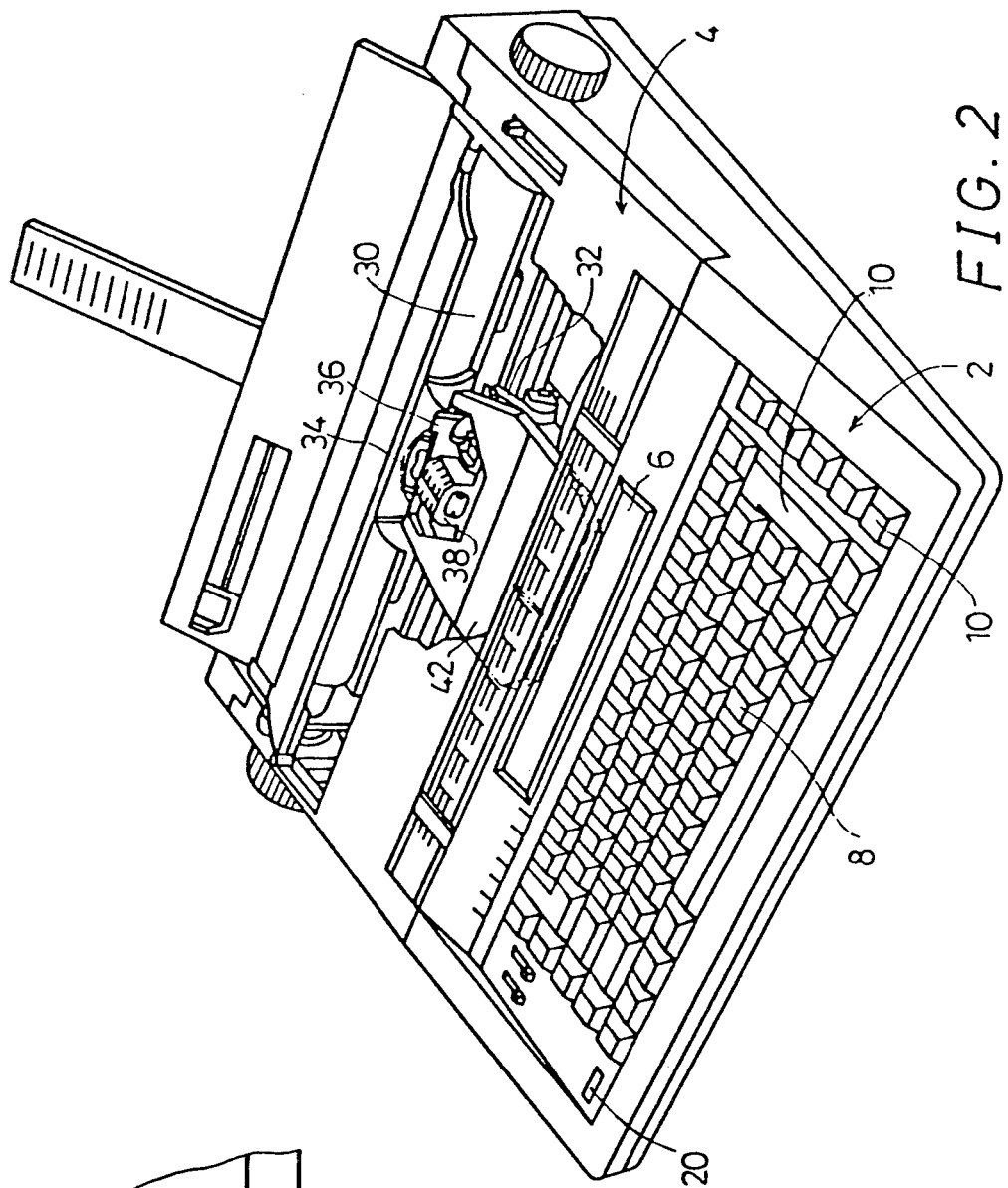
FIG. 2 is a perspective view of an electronic typewriter of a preferred embodiment according to the present invention.

Referring to FIG. 2, the electronic typewriter is generally constructed of a keyboard 2, a printing mechanism 4 and a liquid crystal display 6 capable of displaying a predetermined number of lines of characters or the like inputted by the keyboard 2.

The keyboard 2 includes a plurality of character keys 8 such as letter keys, numeral keys and symbol keys, and also includes a plurality of function keys 10 such as space key, back space key, return key, keyboard mode selecting key for selecting one of selectable optional languages in a multilingual mode, and a selected keyboard mode release key for releasing the selected keyboard mode.

Figure 3:
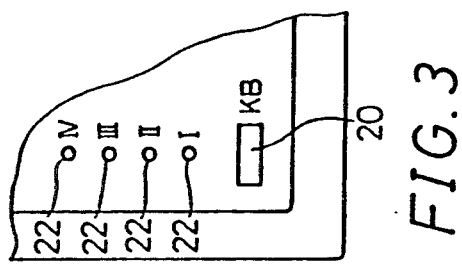
FIG. 3 is a plan view of a part of the keyboard of the electronic typewriter.

The keyboard 2 further includes a keyboard (which will be also referred to as KB) switch 20. As shown in FIG. 3, every time the KB switch 20 is depressed, one of four modes I, II, III and IV is cyclically selected in this order. Four light emitting diodes 22 are so provided as to correspond to the four modes I, II, III and IV, and one of the four light emitting diodes 22 indicates setting of one of the four modes.

The mode I corresponds to a standard keyboard mode of the keyboard 2, e.g., an American English keyboard primarily having English key arrangement, and a code corresponding to English characters is generated by the keyboard. The mode II corresponds to an international keyboard mode for generating codes corresponding to international characters inclusive of internationally usable symbols such as "¥" and "£". The mode III corresponds to a symbol keyboard mode for typing various symbols inclusive of Greek letters. The mode IV corresponds to a multilingual mode. In this mode, an operator can select a optional language from a plurality of selectable optional languages different from the basic language in the standard keyboard mode. For example, when the basic language is English, one of the selectable languages such as German and French can be selected in the multilingual mode.

The printing mechanism 4 includes a platen 30 for retaining and feeding a paper and a carriage 32 movable along the platen 30. The carriage 32 carries a wheel cassette 36 containing a type wheel 34, a solenoid 38 for driving a printing hammer, a ribbon cassette 42 containing a printing ribbon, etc. When any character key is depressed, a type of the type wheel 34 corresponding to the character key depressed is selected by rotation of the type wheel 34, and the type is hammered by the printing hammer against the printing ribbon, thereby obtaining a printed character on the paper. Then, the carriage 32 is moved along the platen 30 by one pitch.

Although not shown, independent motors are provided to drive the platen 30, the carriage 32 and the type wheel 34, and the motors are controlled by a print driving circuit 58 to be hereinafter described. The type wheel 34 is exchangeable together with the wheel cassette 36.

Figure 4:
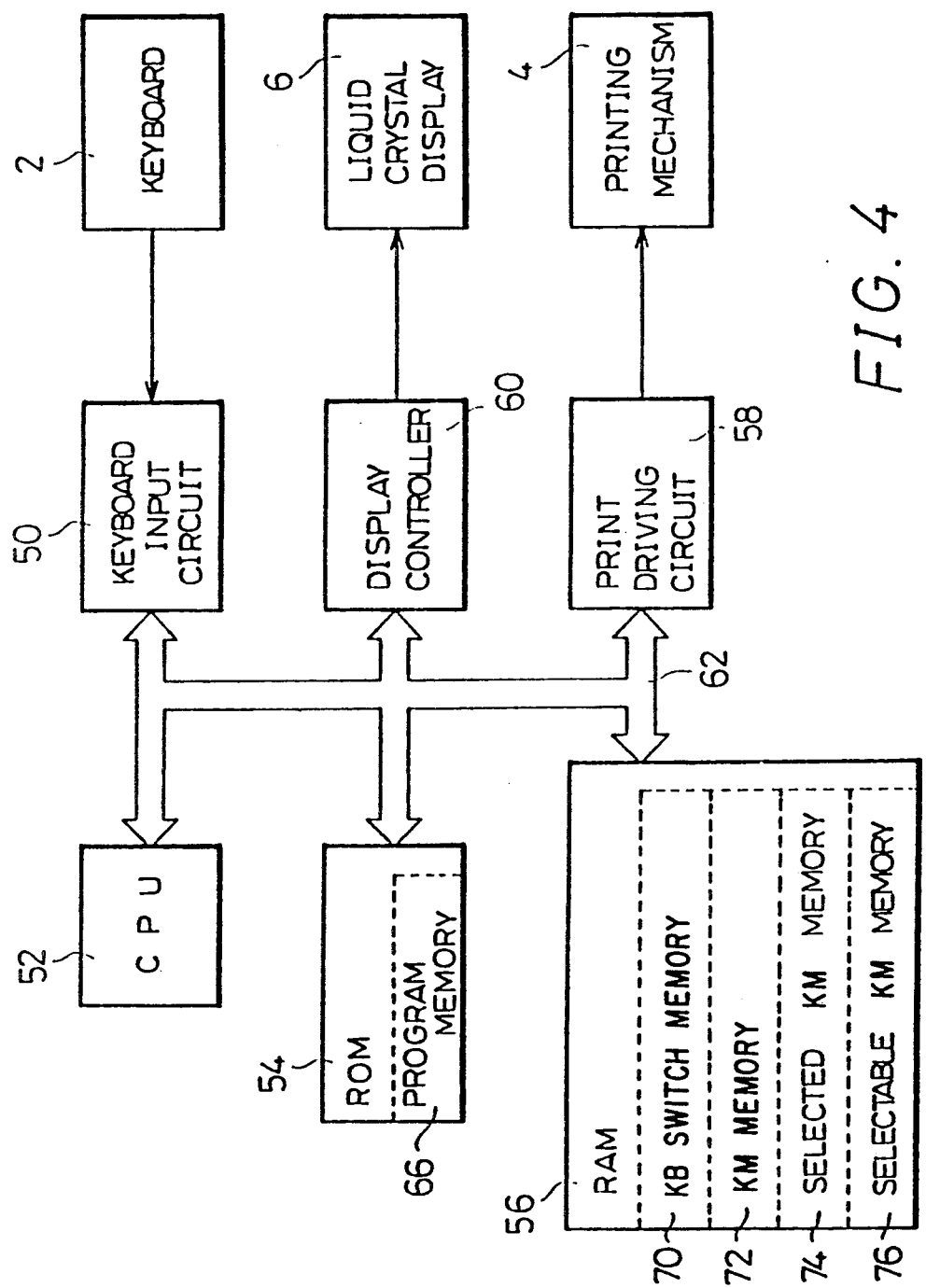
FIG. 4 is a block diagram of a control circuit for controlling the electronic typewriter.

Referring next to FIG. 4 which shows a block diagram of a control circuit for controlling the electronic typewriter.

The keyboard 2 is connected through a keyboard input circuit 50 and a common bus 62 to a CPU 52. The CPU 52 is also connected through the common bus line 62 to ROM 54, RAM 56, print driving circuit 58 and display controller 60.

The ROM 54 includes a program memory 66 storing various control programs for controlling the electronic typewriter.

The RAM 56 includes a keyboard (KB) switch memory 70 for storing a present mode, namely, one of the modes I-IV set by using the KB switch 20, a keyboard mode (KM) memory 72 for storing a valid keyboard mode corresponding to the present mode or a selected keyboard mode, a selected keyboard mode (KM) memory 74 for storing a selected keyboard mode (optional language mode) in the multilingual mode of the mode IV, and a selectable keyboard mode (KM) memory 76 storing the plural selectable keyboard modes (optional language modes). The RAM 56 also includes a buffer, register, counter, etc.

In the case that the keyboard modes (optional language modes) corresponding to German and French, for example, are stored in the selectable KM memory 76, either of the selectable keyboard mode is selected by an operator, and the selected keyboard mode is stored in the selected KM memory 74. The data stored in the selected KM memory 74 is transferred into the KM memory in a certain condition. These features will be described hereinafter in detail.

The print driving circuit 58 receives from the CPU 52 a carriage moving signal and a type selecting code corresponding to a character to be printed, and controls the driving motors for driving the carriage 32 and the type wheel 34 according to the carriage moving signal and the type selecting code.

The display controller 60 is connected to a liquid crystal display 6 to display characters on the liquid crystal display 6, and includes a character generator storing many character dot patterns corresponding to character code.

Figure 5:
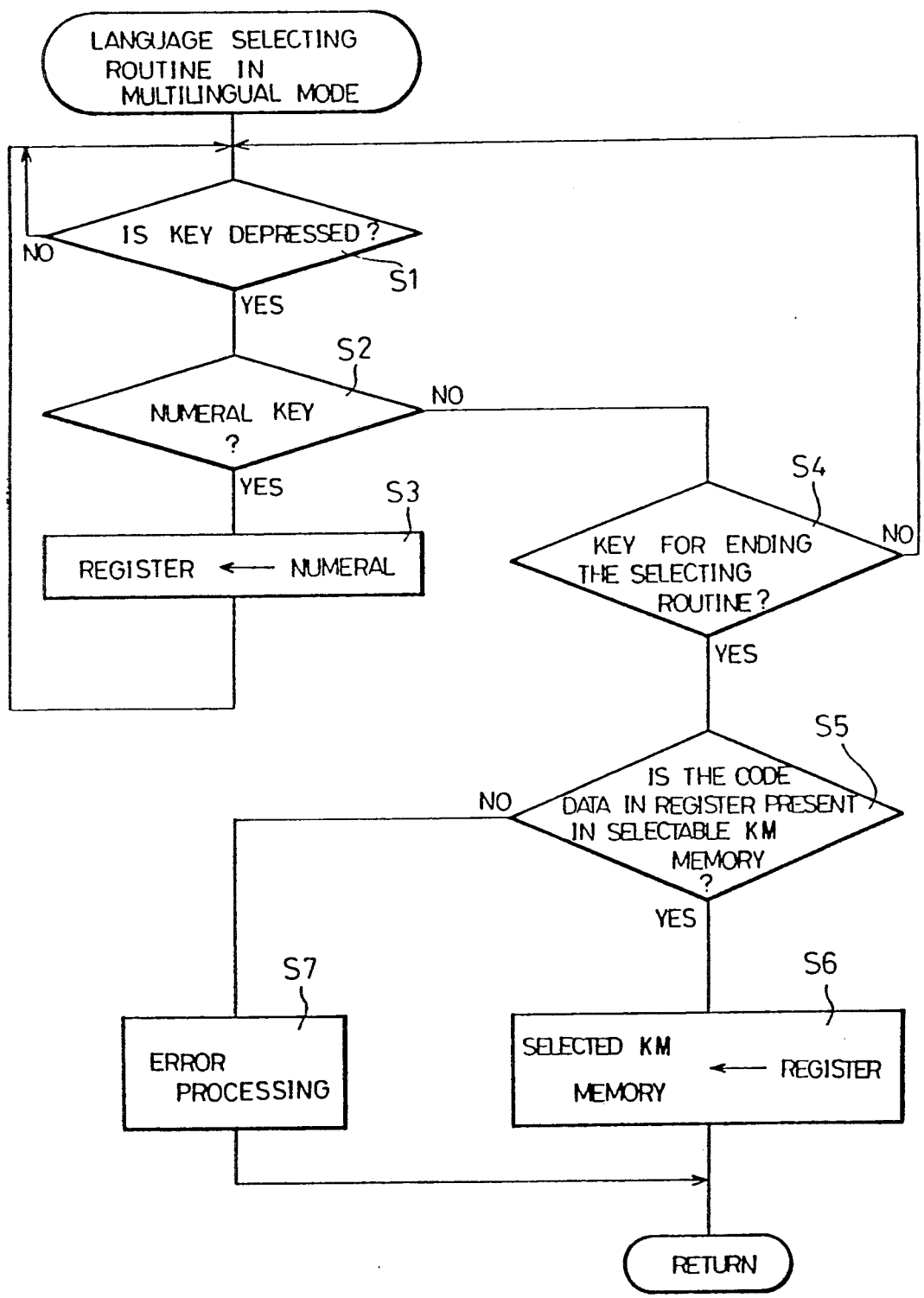
FIG. 5 is a flow chart of a language selecting routine for selecting one keyboard mode (optional language mode) from a plurality of selectable keyboard modes (optional language modes) in the multilingual mode according to the present invention.

Referring to FIG. 5 which shows a flow chart of a language selecting routine according to one of the programs stored in the program memory 66 for selecting one of the plural selectable keyboard modes (optional language modes) in the multilingual mode. Prior to execution of the routine, the multilingual mode is set by depressing the KB switch 20 of the keyboard 2.

In step S1, it is determined whether or not any key of the keyboard 2 has been depressed. If YES, it is determined in step S2 whether or not the depressed key is a numeral key for selecting one of the selectable keyboard modes in the multilingual mode. If YES, the numeral data is stored in a predetermined register in the RAM 56, and the program is returned to step S1. For example, when one of the selectable keyboard modes corresponding to French is selected, the numeral data of "05" is stored in the register.

In step S2, if the answer is NO, the program proceeds to step S4, wherein it is determined whether or not a predetermined key for ending the selecting routine has been depressed. If YES, it is determined in step S5 whether or not the data stored in the register is present in the selectable KM memory 76. If NO in step S5, error processing is executed in step S7. If YES in step S5, the content in the register is stored in the selected CGM memory 74 to end this routine.

Figure 6:
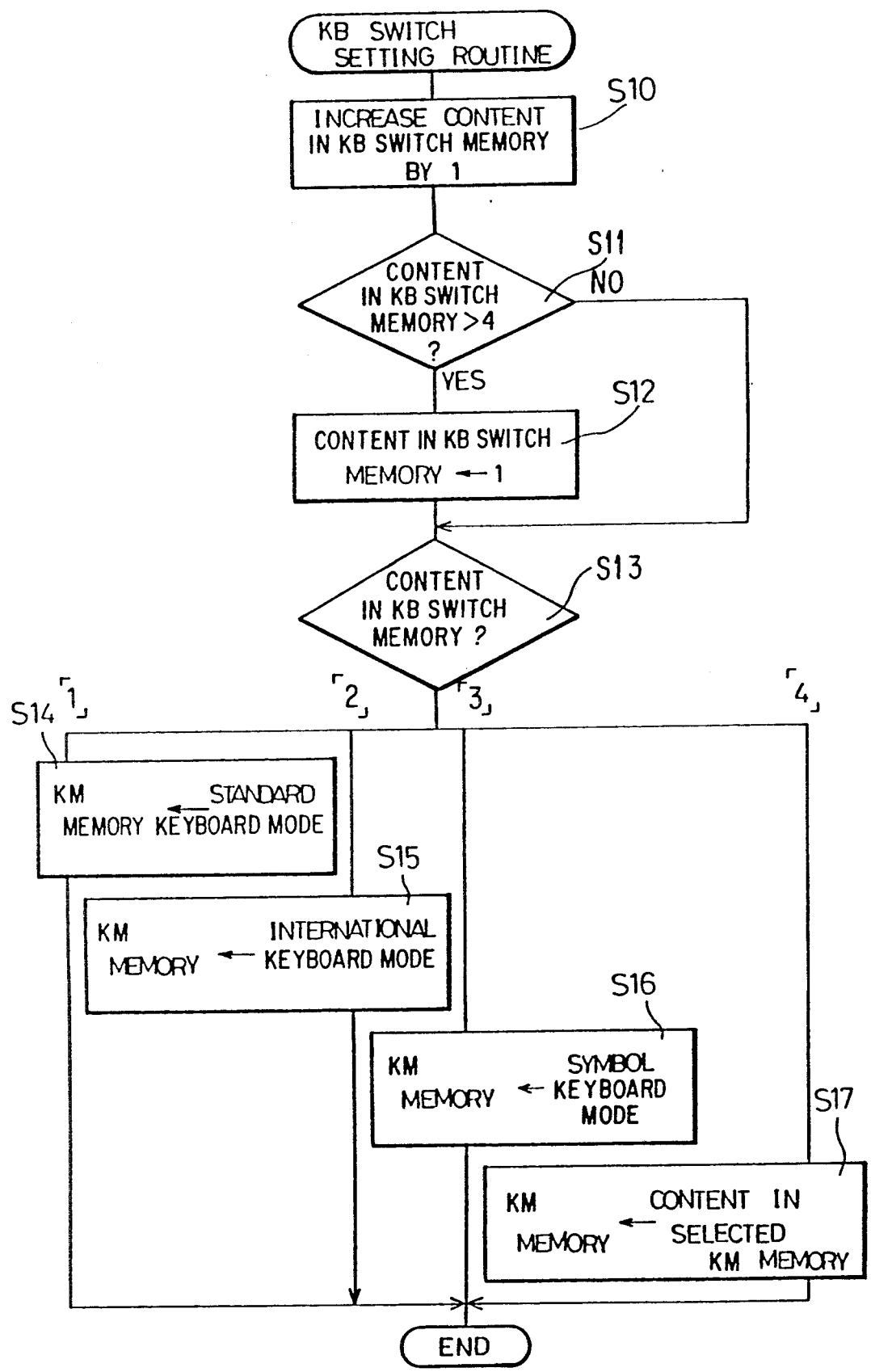
FIG. 6 is a flow chart of a keyboard switch setting routine in setting one keyboard mode according to the present invention.

Referring next to FIG. 6 which shows a setting routine of the KB switch 20, when the KB switch 20 is depressed, the content in the KB switch memory 70 is increased by "1" in step S10. Then in step S11, it is determined whether or not the content in the KB switch memory 70 is more than "4". If YES, the content is updated to "1" in step S12, and if NO, the step S12 is skipped. For example, when the content in the KB switch memory 70 is "1", it is updated to "2", and when the content is "4", it is updated to "1".

Then, the program proceeds to step S13, and it is determined which of "1" to "4" is the content in the KB switch memory 70. If the content is "1", a standard keyboard mode (language mode) is set as the content in the KM memory 72 in step S14. If the content in the mode memory 70 is "2", an international keyboard mode (language mode) is set as the content in the KM memory 72 in step S15. If the content in the KB switch memory 70 is "3", a symbol keyboard mode is set as the content in the KM memory 72 in step S16. If the content in the KB switch memory 70 is "4", then the content in the KM memory 72 is updated to the content stored in the selected KM memory 74 in step S17. In other words, when the KB switch 20 is depressed to set the mode IV, (i.e. the multilingual mode), the selected keyboard mode (optional language mode) set in the routine shown in FIG. 5 is read from the selected KM memory 74, and is stored in the KM memory 72. Thus, a selected keyboard mode as previously selected can be obtained automatically at the same time the KB switch 20 is depressed to set the mode IV corresponding to the multilingual mode. Accordingly, an operator is not required to again and again select one of the selectable languages set every time he sets the multilingual mode, but he is merely required to depress the KB switch 20 and set the mode IV.

The selected keyboard mode (optional language mode) in the multilingual mode can be changed to another option language mode in accordance with the routine shown in FIG. 5.

As will be apparent from the above description, the multilingual mode keyboard mode selecting means is primarily constituted of the KB switch 20 and the CPU 52 for executing the processing of the input signal from the KB switch 20. The keyboard mode (KM) selecting means is primarily constituted of the mode setting keys for selecting one of plural selectable keyboard modes, the memory area of the program memory 66 storing the routine shown in FIG. 5, and the CPU 52 for executing the routine. The selected keyboard mode storing means is primarily constituted of the selected KM memory 74. The selected keyboard mode reading means is primarily constituted of the memory area of the program memory 66 storing the steps S13 and S17 shown in FIG. 6, and the CPU 52 for executing the steps S13 and S17.

Although the printing mechanism in the preferred embodiment employs a type wheel, any other printing mechanisms such as thermal printer and wire dot printer may be employed according to the present invention.

Further, the present invention may be applied to a typewriter without a display such as the liquid crystal display 6, and also may be applied to a word processor having a keyboard and a display without a printing unit.

Having thus described the preferred embodiment of the invention, it should be understood that numerous structural modifications and adaptations may be made without departing from the spirit of the invention.

What is claimed is:

1. A documentation system having a multilingual function, comprising:
   a keyboard for inputting data in a keyboard mode comprising a standard language mode for inputting a standard language and a multilingual mode for inputting one optional language of a plurality of predetermined optional languages different from said standard language;
   keyboard mode selecting means for selecting any one of at least said standard language mode and said multilingual mode;
   optional language mode selecting means for selecting any one of a plurality of predetermined optional language modes to be employed in said multilingual mode under the condition of said multilingual mode;
   selected keyboard mode storing means for storing said optional language mode selected by said optional language mode selecting means as said keyboard mode under the condition of said multilingual mode;
   selected keyboard mode reading means for reading said optional language mode stored by said selected keyboard mode storing means when said multilingual mode is selected by said keyboard mode selecting means; and data processing means for converting a key code data into a character data and outputting said character data on the basis of said standard language mode when said standard language mode is selected by said keyboard mode selecting means, while converting a key code data into a character data and out-putting said character data on the basis of said optional language mode selected in said multilingual mode if a mode selecting operation is conducted under the condition of said multilingual mode, while on the basis of said optional language mode stored in said storing means and read from said reading means if said mode selecting operation is not conducted under the condition of said multilingual mode;

wherein once any one of said optional language modes to be employed in said multilingual mode is selected under the condition of said multilingual mode, and when said multilingual mode is selected again under the condition of said standard language mode, if said mode selecting operation is not conducted, said optional language mode as updated is read and said character data is output in said updated optional language mode without the necessity of selecting said updated optional language mode under the condition of said multilingual mode.

2. The documentation system as defined in claim 1, wherein said documentation system is an electronic typewriter further comprising a printing mechanism having a platen for retaining a paper and a carriage adapted to be moved along said platen, said carriage comprising a type wheel adapted to be detachably mounted thereto, a type wheel motor for rotating said type wheel and locating a type of said type wheel corresponding to said data input at a position opposed to a print line on said platen through a printing ribbon, and a printing hammer for hammering said type against said printing ribbon to effect printing onto said paper, said type wheel having a plurality of kinds of type corresponding to at least said standard language mode and said optional language modes in said multilingual mode, any one of said kinds being selectable by an operator.

3. The documentation system as defined in claim 2, wherein said electronic typewriter further comprises a display device for displaying a document data input by said keyboard, said display device comprising a character generator for converting said code data input by said keyboard into a character pattern data corresponding to said code data, whereby a character is displayed with a predetermined dot pattern.

4. The documentation system as defined in claim 2, wherein said keyboard mode further comprises an international mode where at least one internationally usable character is based and a symbol mode where at least one symbol character is based, and one of said standard language mode, said multilingual mode, said international mode and said symbol mode can be selected by said keyboard mode selecting means, and said kinds of said type wheel further correspond to said international mode and said symbol mode.

5. The documentation system as defined in claim 3, wherein said keyboard mode further comprises an international mode where at least one internationally usable character is based and a symbol mode where at least one symbol character is based, and one of said standard language mode, said multilingual mode, said international mode and said symbol mode can be selected by said keyboard mode selecting means, and said kinds of said type wheel further correspond to said international mode and said symbol mode.

6. The documentation system as defined in claim 4, wherein said keyboard mode selecting means comprises a keyboard switch provided on said electronic typewriter, said keyboard switch being selectively operated to select one of said standard language mode, said multilingual mode, said international mode and said symbol mode.

7. The documentation system as defined in claim 5, wherein said keyboard mode selecting means comprises a keyboard switch provided on said electronic typewriter, said keyboard switch being selectively operated to select one of said standard language mode, said multilingual mode, said international mode and said symbol mode.

8. The documentation system as defined in claim 1, wherein said documentation system is an electronic typewriter.

9. The documentation system as defined in claim 8, wherein said electronic typewriter includes a display device for displaying predetermined lines of characters or the like.

10. The documentation system as defined in claim 1, wherein said keyboard mode selecting means comprises a keyboard switch provided on said keyboard.

11. The documentation system as defined in claim 1, wherein said optional language mode selecting means comprises a language mode selecting routine responsive to at least a numeral key for designating an optional language and a predetermined key for exiting said routine.

12. The documentation system as defined in claim 10, wherein every time said keyboard switch is depressed, one of standard, international, symbol and multilingual modes can be selected.

* * * * *